United States Patent
Kropp et al.

(10) Patent No.: US 7,192,991 B2
(45) Date of Patent: Mar. 20, 2007

(54) CATIONICALLY CURABLE COMPOSITION

(75) Inventors: Michael A. Kropp, Cottage Grove, MN (US); Wayne S. Mahoney, St. Paul, MN (US); Bridget K. Warmka, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 117 days.

(21) Appl. No.: 10/723,827

(22) Filed: Nov. 26, 2003

(65) Prior Publication Data

US 2005/0113474 A1   May 26, 2005

(51) Int. Cl.
C08K 5/17       (2006.01)
C08K 5/3445   (2006.01)
C08J 3/28       (2006.01)

(52) U.S. Cl. .................. 522/25; 522/31; 522/116; 522/120; 522/125; 522/129; 522/114

(58) Field of Classification Search .................. 522/25, 522/31, 114, 116, 120, 125, 129
See application file for complete search history.

(56) References Cited

U.S. PATENT DOCUMENTS

| | | | |
|---|---|---|---|
| 3,708,296 A | 1/1973 | Schlesinger | |
| 4,069,055 A | 1/1978 | Crivello | |
| 4,173,476 A | 11/1979 | Smith et al. | |
| 4,216,288 A | 8/1980 | Crivello | |
| 4,250,311 A | 2/1981 | Crivello | |
| 4,358,571 A | 11/1982 | Kaufman et al. | |
| 4,420,605 A | 12/1983 | Kaufman | |
| 4,430,445 A | 2/1984 | Miyake et al. | |
| 4,503,211 A | 3/1985 | Robins | |
| 4,659,779 A | 4/1987 | Bagga et al. | |
| 4,742,148 A | 5/1988 | Lee et al. | |
| 4,830,855 A | 5/1989 | Stewart | |
| 4,985,340 A | 1/1991 | Palazzotto et al. | |
| 5,084,586 A | 1/1992 | Farooq | |
| 5,089,536 A | 2/1992 | Palazzotto | |
| 5,124,417 A | 6/1992 | Farooq | |
| 5,129,180 A | 7/1992 | Stewart | |
| 5,254,354 A | 10/1993 | Stewart | |
| 5,554,664 A | 9/1996 | Lamanna et al. | |
| 6,060,540 A * | 5/2000 | Wanthal et al. | 523/444 |
| 6,133,335 A | 10/2000 | Mahoney et al. | |
| 6,224,793 B1 | 5/2001 | Hoffman et al. | |
| 6,255,367 B1 * | 7/2001 | Bitler et al. | 523/522 |
| 6,265,459 B1 | 7/2001 | Mahoney et al. | |
| 6,284,827 B1 | 9/2001 | Eckhardt et al. | |
| 6,420,460 B1 | 7/2002 | Zhang et al. | |
| 6,565,969 B1 * | 5/2003 | Lamon et al. | 428/349 |
| 2003/0194560 A1 * | 10/2003 | Spera et al. | 428/411.1 |

FOREIGN PATENT DOCUMENTS

| | | |
|---|---|---|
| EP | 0 511 405 | 11/1992 |
| EP | 1 277 777 | 1/2003 |
| EP | 1 348 742 | 10/2003 |
| JP | 2000-336109 | 12/2000 |

OTHER PUBLICATIONS

Crivello et al., Macromolecules, vol. 10, p. 1307 (1977).
Crivello et al., J. Radiat. Curing, 4(3), 1977, 2.
Bal et al., Polymer, 21, (1980), 423.
Griffiths et al., Inorg. Chem., 1972, vol. 11, pp. 427-429.
A. Gandini et al. in Encyclopedia of Polymer Science and Engineering, Second Edition, J. I. Kroschwitz, Ed., vol. 2, John Wiley & Sons, pp. 729-814, New York (1985.
L. V. McAdams et al. in Encyclopedia of Polymer Science and Engineering, J. I. Kroschwitz, Ed., vol. 6, John Wiley & Sons, p. 322-382, New York (1986).
Encyclopedia of Polymer Science and Engineering, J.I. Kroschwitz, Editor, vol. 2, pp. 708-729, John Wiley & Sons, New York (1985).
C. Thies in Kirk-Othmer Encyclopedia of Chemical Technology, J. I. Kroschwitz, Ed., vol. 16, p. 628-651, John Wiley & Sons, New York (1995)0.
Crivello, S.P. Pappas (Ed.), UV Curing; Science and Technology, Technology Marketing Corp. Norwalk, CT., pp. 23-77 (1978).
Crivello et al.; J.Polym. Sci., Symp. No. 56, p. 383 (1976).

* cited by examiner

Primary Examiner—Susan Berman
(74) Attorney, Agent, or Firm—Steve F. Wolf; Lucy C. Weiss

(57) ABSTRACT

A cationically curable composition comprises (a) at least one cationically curable species; (b) at least one cationic photoinitiator; and (c) at least one encapsulated, polymer-bound base.

19 Claims, No Drawings

CATIONICALLY CURABLE COMPOSITION

FIELD

This invention relates to cationically curable compositions. In other aspects, this invention also relates to cured versions of such compositions, to processes for their preparation, and to articles comprising the cured compositions.

BACKGROUND

Salts that have an organic, inorganic, or organometallic cation and a non-nucleophilic counteranion are widely used in industry as photoinitiators for cationic addition polymerization reactions. Such salts are also known to be useful as latent Brönsted- or Lewis-acid catalysts for step-growth (or condensation) polymerization, depolymerization, and unblocking of functionalized polymers.

Common photoinitiator salts include onium salts such as the diaryliodonium, triarylsulfonium, and (cyclopentadienyl)(arene)iron$^+$ salts of the anions $PF_6^-$, $AsF_6^-$, and $SbF_6^-$. For such salts, it is known that the identity of the anion can significantly affect the rate of polymerization that can be achieved. The hexafluoroantimonate anion, $SbF_6^-$, for example, is associated with relatively fast cures and is often used in industrial applications.

Although onium salts are typically the initiators of choice for photocationic addition polymerization reactions, they can contain toxic elements and exhibit poor solubility in many organic solvents. The onium salts and their byproducts also tend to persist after polymerization, thereby imparting a strong acidic character to the resulting polymerized material.

Furthermore, with highly fluorinated anions, free hydrofluoric acid can be formed in the polymerized material through thermal degradation or hydrolysis of the anion. This can lead to thermal instability of the polymerized material or corrosion of substrates on which the polymerized material is placed.

One solution to this problem has been to add a base to the starting polymerizable composition as a neutralizing agent for the acid. However, bases can reduce the rate of polymerization and can leave unwanted byproducts of the neutralization reaction in the polymerized material. Another approach has been to add a compound capable of forming a water-insoluble or barely water-soluble compound, which, after the polymerization reaction, enters into a neutralization reaction with the acid generated by the cationic polymerization initiator at the time of polymerization.

It has been found that salts comprising anions having three highly fluorinated alkylsulfonyl, fluorinated arylsulfonyl, or perfluoroalkylsulfonyl groups, (or combinations thereof) exhibit improved solubility in organic media (relative to, for example, $PF_6^-$ and $SbF_6^-$ analogs) and have relatively strong catalytic activity. For example, cationic photoinitiators comprising a tris-(trifluoromethanesulfonyl) methide ("methide") anion provide polymerization rates in cationic addition polymerization reactions comparable to those provided by photoinitiators that contain $SbF_6^-$.

In addition, the methide salts are stable, non-nucleophilic, do not readily hydrolyze to release fluoride ions that can be corrosive, and do not contain highly toxic elements such as arsenic and antimony. Such lack of corrosivity is important, as cationically polymerized materials (for example, conductive adhesives) are used in the electronics field, often in contact with multiple metal surfaces such as copper, tin, and indium-tin oxide. Epoxy compositions containing $SbF_6^-$ anion tend to corrode indium-tin oxide surfaces whereas compositions containing methide anion show significantly less corrosion.

Although the methide salts seem to be direct replacements for $SbF_6^-$-containing initiators in cationic addition polymerization reaction systems as far as polymerization rate is concerned, it has been found that methides impart significantly reduced thermal stability to a resulting polymerized material. For example, epoxy formulations that have been photopolymerized using methide photoinitiators show significant decomposition at elevated temperatures compared with similarly formulated systems that have been photopolymerized using $SbF_6^-$ salts.

SUMMARY

Thus, we recognize that there is a need for cationically curable compositions that can be rapidly photocured to provide cured compositions that are relatively thermally stable and noncorrosive.

Briefly, in one aspect, this invention provides a cationically curable composition, which comprises
a) at least one cationically curable species;
b) at least one cationic photoinitiator; and
c) at least one encapsulated, polymer-bound base.

It has been discovered that encapsulated, polymer-bound bases can improve the thermal stability of cationically cured compositions without significantly affecting the rate of cure. Such bases can be designed so that, under the curing conditions utilized (for example, at the curing temperature during photocure of the composition), they are chemically isolated from the other components. Under other conditions (for example, at elevated temperatures), they can be activated and available to neutralize any acidic species that are produced during the curing reaction.

Preferred embodiments of the composition of the invention cure rapidly and, when cured, exhibit improved thermal stability relative to the corresponding compositions without encapsulated, polymer-bound base. Such embodiments also exhibit reduced static corrosion when in contact with metallic or metal oxide surfaces—especially conductive surfaces useful in the electronics industry (for example, copper, aluminum, and indium-tin-oxide). Thus, such embodiments meet the need for cationically curable compositions that can be rapidly photocured to provide cured compositions that are relatively thermally stable and noncorrosive.

In other aspects, this invention also provides the composition of the invention in at least partially cured form (that is, the composition of the invention further comprising at least some cured cationically curable species); an article comprising the composition of the invention in at least partially cured form; and a process for making an at least partially cured composition comprising the steps of:
a) providing the cationically curable composition of the invention;
b) irradiating at least a portion of the composition to effect at least partial cure of the portion; and
c) exposing at least the irradiated portion of the composition to conditions sufficient to make the encapsulated, polymer-bound base chemically available for reaction.

As used in this application:
"cure" means to effect polymerization and/or to effect crosslinking (as evidenced, for example, by a change in density, viscosity, modulus, color, pH, refractive index, or other physical or chemical property);
"encapsulated" (in regard to the base component of the cationically curable composition) means that the base component is sufficiently chemically isolated from the other components of the composition (for example, by enclosure in an encapsulant material) during photocuring that the total cure exotherm energy (as measured by differential photocalorimetry (DPC) at less than about 35° C.) of the composition differs from that of the corresponding composition without the base component by no more than about 20 percent (preferably, no more than about 10 percent);

"substantially insoluble" means dissolving in an amount less than about 5% by weight, preferably less than about 1% by weight, and more preferably less than about 0.1% by weight, in the cationically curable composition (based on the total weight of the composition); and "polymer-bound" means covalently bonded to a solid, organic polymer or inorganic particle that is substantially insoluble in the cationically curable composition.

DETAILED DESCRIPTION

Cationically Curable Species

Cationically curable species suitable for use in the composition of the invention include cationically polymerizable monomers, cationically polymerizable oligomers, cationically crosslinkable polymers, and the like, and mixtures thereof. Polymerization of such species is most commonly acid-initiated.

Useful cationically curable species can contain at least one cationically curable group and include, for example, epoxides, cyclic ethers, vinyl ethers, side-chain unsaturated aromatic hydrocarbons, lactones and other cyclic esters, cyclic carbonates, cyclic acetals, aldehydes, cyclosiloxanes, cyclotriphosphazenes, and the like, and mixtures thereof. Other useful cationically curable species include those described by G. Odian in *Principles of Polymerization*, Third Edition, John Wiley & Sons, New York (1991) and by A. Gandini et al. in *Encyclopedia of Polymer Science and Engineering*, Second Edition, J. I. Kroschwitz, Ed., Vol 2, John Wiley & Sons, pp. 729–814, New York (1985). Preferred species include epoxides, vinyl ethers, and mixtures thereof. Mixtures or blends (in any proportion) of one or more vinyl ether resins and/or one or more epoxy resins can be utilized.

Suitable epoxides include those known to undergo cationic polymerization including, for example, 1,2-, 1,3-, and 1,4-cyclic ethers (also designated as 1,2-, 1,3-, and 1,4-epoxides) and the epoxy resins described by L. V. McAdams et al. in *Encyclopedia of Polymer Science and Engineering*, J. I. Kroschwitz, Ed., Vol. 6, John Wiley & Sons, p. 322–382, New York (1986).

Representative examples of useful epoxides include styrene oxide, propylene oxide, and cycloaliphatic epoxies such as cyclohexene oxide, vinylcyclohexene oxide, vinylcyclohexene dioxide, and the resins available from Dow Chemical, Midland, Mich. under the trade designation "CYRACURE" (such as 3,4-epoxycyclohexylmethyl-3,4-epoxycyclohexane carboxylate and bis-(3,4-epoxycyclohexyl) adipate; and glycidyl ether type epoxy resins such as epichlorohydrin, glycidol, 1,4-butanediol diglycidyl ether, polyglycidyl ether of phenolformaldehyde, epoxy resins available under the trade designation "EPON" from Resolution Performance Products, Houston, Tex. (including the diglycidyl either of bisphenol A and chain extended versions of this material such as EPON 828, EPON 1001, EPON 1004, EPON 1007, EPON 1009, and EPON 2002) and similar materials from other manufacturers (including epoxidized phenolic novolac resins such as DEN 431 and DEN 438 available from Dow Chemical Co., Midland Mich., and epoxidized cresol novolac resins such as ARALDITE ECN 1299 available from Vantico AG, Basel, Switzerland); dicyclopentadiene dioxide; epoxidized vegetable oils such as epoxidized linseed and soybean oils available under the trade designations "VIKOLOX" and "VIKOFLEX" from Atofina, Philadelphia, Pa.; epoxidized polymers available under the trade designation "KRATON LIQUID" Polymers (such as L-207) from Kraton Polymers, Houston, Tex., epoxidized polybutadiene resins available under the trade designation "POLY BD" from Sartomer, Exton, Pa., and epoxidized polystyrene/polybutadiene blends available under the trade designation "EPOFRIEND" from Daicel USA Inc., Fort Lee, N.J., resorcinol diglycidyl ether, and the like, and mixtures thereof.

Preferred epoxy resins include the resins available under the trade designation "CYRACURE" (especially 3,4-epoxycyclohexylmethyl-3,4-epoxycyclohexanercarboxylate, bis-(3,4-epoxycyclohexyl) adipate, and the bisphenol A EPON resins including 2,2-bis-p-(2,3-epoxypropoxy)phenylpropane and chain extended versions of this material).

When preparing compositions containing epoxides, hydroxyl-functional materials can be added. Such materials can be present as a mixture or blend and can include mono- and/or polyhydroxyl containing materials. Preferably, the hydroxyl-functional materials contain at least two hydroxyl groups (average functionality). When used, the hydroxyl-functional material can aid in chain extension and preventing excess crosslinking of the epoxy during curing (for example, so as to increase the toughness of the resulting cured composition).

Useful hydroxyl-functional materials include aliphatic, cycloaliphatic, and alkanol-substituted arene mono- or polyalcohols (preferably having from about 2 to about 18 carbon atoms and from about two to about five, more preferably, about two to about four, hydroxyl groups (average functionality)), and the like, and mixtures thereof. Representative examples of suitable mono-alcohols include methanol, ethanol, 1-propanol, 2-propanol, 2-methyl-2-propanol, 1-butanol, 2-butanol, 1-pentanol, neopentyl alcohol, 3-pentanol, 1-hexanol, 1-heptanol, 1-octanol, 2-phenoxyethanol, cyclopentanol, cyclohexanol, cyclohexylmethanol, 3-cyclohexyl-1-propanol, 2-norbomanemethanol, and tetrahydrofurfuryl alcohol.

Representative examples of useful polyols include 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimrethylolethane, pentaerythritol, quinitol, mannitol, sorbitol, diethylene glycol, triethylene glycol, tetraethylene glycol, glycerine, 2-ethyl-2-(hydroxymethyl)-1,3-propanediol, 2-ethyl-1,3-pentanediol, 1,4-cyclohexanedimethanol, 1,4-benzene-dimethanol, polyalkoxylated bisphenol A derivatives, and the like, and mixtures thereof. Other examples of useful polyols include those described in U.S. Pat. No. 4,503,211 (Robins), the descriptions of which are incorporated herein by reference.

Suitable higher molecular weight polyols include polyethylene and polypropylene oxide polymers in the molecular weight ($M_n$) range of about 200 to about 20,000 (such as the polyethyleneoxide materials available under the trade designation "CARBOWAX" from Dow Chemical Co., Midland, Mich.), caprolactone polyols in the molecular weight range of about 200 to about 5,000 (available under the trade designation "TONE" from Dow Chemical), polytetramethylene ether glycol in the molecular weight range of about 200 to about 4,000 (such as materials available under the trade designation "TERATHANE" from du Pont, Wilmington, Del.), polyethylene glycol (such as PEG 200 available from Dow Chemical), hydroxyl-terminated polybutadiene resins (available under the trade designation "POLY BD" from Atofina, Philadelphia, Pa.), phenoxy resins (such as those commercially available from Phenoxy Associates, Rock Hill, S.C. and similar materials supplied by other manufacturers), and the like, and mixtures thereof.

Representative examples of useful vinyl ether-containing monomers include methyl vinyl ether, ethyl vinyl ether, tert-butyl vinyl ether, isobutyl vinyl ether, triethyleneglycol divinyl ether (available under the trade designation "RAPI-CURE DVE-3" from International Specialty Products, Wayne, N.J.), 1,4-cyclohexanedimethanol divinyl ether (RAPI-CURE CHVE, International Specialty Products), trimethylolpropane trivinyl ether (TMPTVE, available from BASF Corp., Mount Olive, N.J.), divinyl ether resins available under the trade designation "VECTOMER" from Morflex, Greensboro, N.C. (such as VECTOMER 2010, VECTOMER 2020, VECTOMER 4010, and VECTOMER 4020), and similar materials from other manufacturers, and the like, and mixtures thereof.

Bifunctional monomers (monomers containing two different functional groups) can also be used in the composition of the invention. Suitable bifunctional monomers include those that possess cationically polymerizable functionality and/or functionality that can independently polymerize (for example, pendant acrylate functionality) and/or can copolymerize with cationically polymerizable functionalities (for example, epoxy-alcohol copolymerization).

Photoinitiators

Photoinitiators suitable for use in the composition of the invention include cationic photoinitiators. Useful cationic photoinitiators include energy-activatable salts, the cations of which can have initiating, curing, or catalytic properties when activated by actinic radiation. The energy-activatable salts can have a photochemically-reactive cationic portion and a nonnucleophilic anion. A broad class of cationic photoinitiators can be used, including those described in U.S. Pat. Nos. 4,250,311 (Crivello); U.S. Pat. No. 3,708,296 (Schlesinger); U.S. pat. No. 4,069,055 (Crivello); U.S. Pat. No. 4,216,288 (Crivello); U.S. Pat. No. 5,084,586 (Farooq); U.S. Pat. No. 5,124,417 (Farooq); U.S. Pat. No. 4,985,340 (Palazzotto et al.); and U.S. Pat. No. 5,089,536 (Palazzotto), the descriptions of which are incorporated herein by reference.

Suitable cations include organic onium cations, organometallic complex cations, and the like. Useful organic onium cations include, for example, those described in U.S. Pat. Nos. 4,250,311 (Crivello), U.S. Pat. No. 3,708,296 (Sheldon), U.S. Pat. No. 4,069,055 (Crivello), U.S. Pat. No. 4,216,288 (Crivello), U.S. Pat. No. 5,084,586 (Farooq), and U.S. Pat. No. 5,124,417 (Farooq), the descriptions of which are incorporated herein by reference. Such cations include those of aliphatic and aromatic Group IVA–VIIA (CAS version) centered onium salts.

Preferred are I-, S-, P-, and C-centered onium salts (for example, sulfoxonium, diaryliodonium, triarylsulfonium, carbonium, and phosphonium). Most preferred are I- and S-centered onium salts (for example, diaryliodonium and triarylsulfonium).

The aryl group of such salts can be an unsubstituted or substituted aromatic moiety having up to about four independently selected substituents. The substituents preferably have fewer than about 30 carbon atoms and up to about 10 heteroatoms selected from N, S, non-peroxidic O, P, As, Si, Sn, B, Ge, Te, Se, and the like. Examples of such substituents include hydrocarbyl groups (such as methyl, ethyl, butyl, dodecyl, tetracosanyl, benzyl, allyl, benzylidene, ethenyl, and ethynyl); hydrocarbyloxy groups (such as methoxy, butoxy and phenoxy); hydrocarbylmercapto groups (such as methylmercapto and phenylmercapto); hydrocarbyloxycarbonyl groups (such as oxycarbonyl and phenoxycarbonyl); hydrocarbylcarbonyloxy groups (such as acetoxy and cyclohexanecarbonyloxy); hydrocarbylcarbonamide groups (such as acetamido and benzamido); azo; boryl; halo groups (such as chloro, bromo, iodo and fluoro); hydroxy; oxy; diphenylarsino; diphenylstibino; trimethylgermano; trimethylsiloxy; and aromatic groups (such as cyclopentadienyl, phenyl, tolyl, naphthyl, and indenyl). In sulfonium salts, it is possible for a substituent to be further substituted with a thioether or thioether-containing sulfonium cation (for example, diphenyl [4-(phenylthio)phenyl] sulfonium and (thiodiphenylene)bis-diphenylsulfonium).

Useful organometallic complex cations include those described in U.S. Pat. No. 4,985,340 (Palazzotto et al.), the descriptions of which are incorporated herein by reference, and represented by the formula:

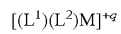 (I)

wherein M is a metal selected from the group consisting of Cr, Mo, W, Mn, Re, Fe, Ru, Os, Co, Rh, Ir, Pd, Pt, and Ni (preferably, selected from Cr, Mo, W, Mn, Fe, Ru, Co, Pd, and Ni; and, most preferably, from Mn and Fe); $L^1$ represents 1 or 2 cyclic, polyunsaturated ligands independently selected from the group consisting of substituted and unsubstituted cyclopentadienyl, cyclohexadienyl, cycloheptatrienyl, cycloheptatrienyl, cyclooctatetraenyl, heterocyclic compounds, and aromatic compounds selected from substituted or unsubstituted arene compounds, and compounds having 2 to 4 fused rings, and units of polymer (for example, a phenyl group of polystyrene, poly(styrene-co-butadiene), poly(styrene-co-methyl methacrylate), poly(α-methylstyrene), and the like; a cyclopentadiene group of poly(vinylcyclopentadiene); a pyridine group of poly(vinylpyridine)) and the like, each capable of contributing 3 to 8 electrons to the valence shell of M; $L^2$ represents none, or 1 to 3 nonanionic ligands contributing an even number of electrons and independently selected from the group consisting of carbon monoxide, ketones, olefins, ethers, nitrosonium, phosphines, phosphites, and related derivatives of arsenic and antimony, organonitriles, amines, alkynes, isonitriles, dinitrogen, and the like, with the proviso that the total electronic charge contributed to M results in a net residual positive charge of q to the complex cation; and q is an integer of 1 or 2.

Useful anionic portions of the photoinitiators include those that can be represented by $X_n$, where X is an anion selected from the group consisting of tris-$R_f$ sulfonyl methide, bis-$R_f$ sulfonyl imide, tris-(fluorinated aryl)sulfonyl methide, tetrakis-(fluorinated aryl) borate and organic sulfonate anions, wherein each $R_f$ is independently selected from the group consisting of fluorinated or perfluorinated (preferably, perfluorinated) alkyl radicals having from 1 to about 20 carbon atoms, fluorinated aryl radicals having from 6 to about 10 carbon atoms, and ring structures formed from two said fluorinated or perfluorinated alkyl radicals joined together to form a unitary alkylene radical having 5 or 6 ring atoms, said radicals optionally containing one or more divalent oxygen, trivalent nitrogen, or divalent sulfur atoms;

and n is an integer of 1 or 2 (the number of complex anions required to neutralize the charge "q" on the complex cation).

Examples of such anions include tris-(fluorinated alkyl) sulfonyl methide, bis-(fluorinated alkyl)sulfonyl imide, and tris-(fluorinated aryl)sulfonyl methide, as described in U.S. Pat. No. 5,554,664 (Lamanna et al.), the descriptions of which are incorporated herein by reference. Useful anions also include those described in U.S. Pat. No. 6,265,459 (Mahoney et al.), the descriptions of which are incorporated herein by reference.

In addition to those described above, suitable anions, X, for use as the counterion to the above-described cations include those represented by the formula $$DQ_r \quad (II)$$

wherein D is a metal from Groups IB to VIIB and VIII or a metal or metalloid from Groups IIIA to VA of the Periodic Table of Elements (CAS notation); Q is a halogen atom, a hydroxyl group, a substituted or unsubstituted phenyl group, or a substituted or unsubstituted alkyl group; and r is an integer of 1 to 6. Preferably, D is selected from metals such as copper, zinc, titanium, vanadium, chromium, aluminum, tin, gallium, zirconium, indium, manganese, iron, cobalt, and nickel, or from metalloids such as boron, antimony, arsenic, and phosphorus. Preferably, Q is a halogen atom (more preferably, chlorine or fluorine). Representative examples of such anions include $B(phenyl)_4^-$, $B(phenyl)_3(alkyl)^-$ (where alkyl can be ethyl, propyl, butyl, hexyl, and the like), $BF_4^-$, $PF_6^-$, $AsF_6^-$, $SbF_6^-$, $FeCl_4^-$, $SnCl_5^-$, $SbF_5OH^-$, $AlCl_4^-$, $AlF_6^-$, $GaCl_4^-$, $InF_4^-$, $TiF_6^-$, $ZrF_6^-$, $B(C_6F_5)_4^-$, and $B(C_6F_3(CF_3)_2)_4^-$. Preferred anions include $BF_4^-$, $PF_6^-$, $AsF_6^-$, $SbF_6^-$, $SbF_5OH^-$, $B(C_6F_5)_4^-$, $B(C_6F_3(CF_3)_2)_4^-$, and $B(phenyl)_4^-$.

Other anions, X, useful in suitable photoinitiators include $CH_3SO_3^-$, $CF_3SO_3^-$, $C_6H_5SO_3^-$, p-toluenesulfonate, p-chlorobenzenesulfonate, and the like. Preferred anions include $BF_4^-$, $PF_6^-$, $SbF_6^-$, $SbF_5OH^-$, $AsF_6^-$, $SbCl_6^-$, $CF_3SO_3^-$, $C(SO_2CF_3)_3^-$, and $N(SO_2CF_3)_2^-$, with $C(SO_2CF_3)_3^-$ and $N(SO_2CF_3)_2^-$ being most preferred.

Encapsulated, Polymer-bound Bases

Bases suitable for use in the composition of the invention include those that are encapsulated and polymer-bound. Such bases can be sufficiently chemically isolated from the other components of the composition (for example, by enclosure in an encapsulant material) that the base does not significantly interfere with the curing of the composition. (For example, the total cure exotherm energy (as measured by differential photo-calorimetry (DPC) at less than about 35° C.) of the composition differs from that of the corresponding composition without the base component by no more than about 20 percent (preferably, no more than about 10 percent).) Such bases can also be covalently bonded to a particle that is substantially insoluble in the cationically curable composition. Preferably, the particle also remains substantially insoluble in the composition during the process of curing and thereafter.

A class of suitable encapsulated, polymer-bound bases includes those represented by the formula $A-B_n$, wherein A is a substantially insoluble particle, each B is an independently selected base unit, n is an integer of at least 1 (representing the number of base units per particle, A), and there is a covalent chemical bond between A and each B. The particle, A, can be any solid matrix (organic or inorganic) that is substantially insoluble in the composition of the invention and that can form a covalent bond with the base. It can be useful and preferable if the particles are small, solid particles that can be easily and substantially uniformly dispersed throughout the composition.

Examples of useful particles include organic polymer particles, inorganic particles, and mixtures thereof. Particularly useful are organic polymer particles. These include, for example, particles of poly(styrene-co-divinylbenzene), poly (butadiene), poly(vinyl alcohol), poly(vinyl chloride), poly (acrylonitrile), poly((meth)acrylates), and the like, and mixtures thereof. Such polymers contain at least one functional group that can provide a site to form a covalent bond to an organic base.

Useful particles also include, but are not limited to, inorganic particles (for example, particles of silica, alumina, and other oxides of metals, and the like, and mixtures thereof). These inorganic particles can be provided with functionality for attachment of a basic species, B, by treatment with a wide variety of reagents. For example, silica particles can be treated with a wide variety of silane coupling agents (such as 3-trimethoxysilyl-1-propylamine) that bond covalently to the silica particle and provide either a base or a functionality on to which a base can be covalently attached.

It can be advantageous if the particles are substantially spherical in shape, although other shapes can be utilized. The particles can range in size or average particle diameter (where "diameter" refers not only to the diameter of substantially spherical particles but also to the longest dimension of non-spherical particles) from millimeters to micrometers to nanometers. Smaller particles tend to be able to disperse more easily in the curable composition. Particularly useful are particles that are micrometers or nanometers in average diameter. Substantially spherical particles having an average diameter of about 0.1 to about 75 microns are preferred (more preferably, about 0.1 to about 30 microns; most preferably, about 0.1 to about 20 microns).

Suitable base units, B, include any basic species that has a high affinity for a proton (Bronsted acid) or a Lewis acid and that is capable of covalent attachment to the particle. Any basic species that has a conjugate acid that is weaker than the acids produced by photoinitiation of the cationically curable species can be used. Preferred base units include primary amines, secondary amines, tertiary amines, and heterocyclic amines (such as imidazole, pyrazole, triazole, tetrazole, other five-membered ring heterocyclic compounds containing at least one ring nitrogen atom, pyridine, pyridazine, pyrimidine, pyrazine, six-membered heterocyclic compounds containing at least one ring nitrogen atom, and the like). Most preferred base units include primary amines, secondary amines, tertiary amines, and imidazole.

Useful bases, $A-B_n$, include polymer-supported catalysts that are well known in the art (for example, those described by B. C. Gates et al. in the *Encyclopedia of Polymer Science and Engineering*, J. I. Kroschwitz, Editor, Vol. 2, pages 708–729, John Wiley & Sons, New York (1985). Such catalysts include, for example, polyvinylimidazole and poly (4-vinylaniline).

As mentioned above, the bases are encapsulated so as to be chemically isolated from the other components of the cationically curable composition during photocuring The curing of such compositions is known to be acid catalyzed and to occur at a rate that is dependent upon the concentration of acid species present in the composition. Thus, during photocuring, it is important to have acid species present in sufficient concentration to initiate polymerization. Basic species in the composition can neutralize acid species produced by the photoinitiator and can interfere with cationic initiation and chain propagation. This can lower the concentration of acid species in the composition, etc., and thereby retard the rate of curing.

However, the acid species can also decrease the thermal stability of a resulting cured composition and can cause corrosivity when the cured composition is in contact with certain metals. Through encapsulation, the bases can be kept chemically isolated (under the curing conditions utilized) and unavailable to participate in retarding the rate of cure. Yet, under different conditions (at elevated temperatures for example), the bases can be activated and available to neutralize any acidic species that are produced during the curing reaction, so as to reduce the thermal instability and/or corrosivity of the cured composition.

For example, the photocuring reaction can be carried out at a temperature that is well below a thermal phase transition temperature of an encapsulant material (preferably, at or slightly above room temperature). A useful thermal phase transition temperature for this purpose is a melting point of significant crystallinity within a polymeric encapsulant material. An appropriate glass transition temperature or other significant thermal phase transition can also be useful. After the photocuring reaction has been allowed to proceed to vitrification, the resulting cured composition can be heated to expose the bases. The base can then be available to scavenge or neutralize free acidic species in the composition. Since the base unit, B, is polymer-bound, the acid species produced by the curing reaction can become bound with the base on the polymer and unable to migrate through or out of the cured composition.

The bases can be encapsulated in any manner that enables the above-described chemical isolation of the base during photocuring and subsequent activation (for example, by heating). For example, the particle, A, can comprise an encapsulant material in the form of at least one side-chain crystallizable polymer. The crystallizable side chains can make the function of the base temperature-dependent, for example by forming an "isolation shell" around the base unit(s) at temperatures below the melting temperature of the side chains.

Particularly useful particles comprising side-chain crystallizable polymers include those described in U.S. Pat. Nos.4,830,855 (Stewart et al.); U.S. Pat. No. 5,129,180 (Stewart et al.); U.S. Pat. No. 5,254,354 (Stewart et al.); U.S. Pat. No. 6,224,793 (Hoffman et al.); and U.S. Pat. No. 6,255,367 (Bitler et al.); the descriptions of which are incorporated herein by reference. Useful particles made from side-chain crystallizable polymers generally contain side chains that comprise substituted and/or unsubstituted n-alkyl groups of about 6 to about 50, preferably about 12 to about 50, carbon atoms, derived, for example, from one or more n-alkyl acrylates or methacrylates.

The melting point of the side chain can be controlled by the number of carbon atoms in the n-alkyl group or groups of such polymers and is generally not heavily dependent on the molecular weight of the polymer or the presence of other co-monomer units. Polymers with crystallizable side chains generally melt over a small temperature range, for example, over a range of less than about 30° C. Depending upon the chemical nature (for example, the chain length) of the crystallizable side chains, the melting point of the chains can be adjusted so that the base can be activated in a narrow temperature increment between about 40° C. and about 100° C. Most useful are those side chains that melt in the range of about 60° C. to about 70° C. The preparation of such polymers is described, for example, in U.S. Pat. No. 6,255,367 (Bitler et al.), the description of which is incorporated herein by reference. Preferred bases with crystallizable side chains that are useful in the composition of the invention include materials available under the tradename "INTELIMER" (such as INTELIMER Polymers 7001, 7002, and 7004 that are available from the Landec Corporation, Menlo Park, Calif.).

Alternatively, the bases can be encapsulated by enclosing them (particle and all) within one or more encapsulant materials. For example, an encapsulant material can form a protective shell that substantially surrounds and chemically isolates the bases from the remainder of the curable composition. Microencapsulation is a preferred way of forming a protective shell surrounding the bases. Techniques for the microencapsulation of small solid particles are well known and, for example, can consist of coating the particles with a thin film or shell of encapsulant material.

Microencapsulation is further described, for example, by C. Thies in *Kirk-Othmer Encyclopedia of Chemical Technology*, J. I. Kroschwitz, Ed., Vol 16, p. 628–651, John Wiley & Sons, New York (1995). Preferred encapsulant materials for use in microencapsulation include those that are substantially insoluble in the curable composition before and during photocuring, that can sufficiently isolate the base from participating in photocuring, and that can be functionally and/or physically removed by elevating the temperature of the composition. Usually the elevated temperature causes a phase change (for example, from crystalline to non-crystalline) allowing the encapsulant material to "melt away" from the base, making the base available for reaction with acidic species in the composition. For example, hydrocarbon-based waxes that melt above about 70° C. are a class of materials that can be particularly useful as encapsulant materials. Useful materials include stearic acid, eicosanoic acid, hexacosanoic acid, octacosanoic acid, and the like, and mixtures thereof.

As mentioned above, bases used in the composition of the invention are preferably substantially insoluble in the curable composition at the temperature of the photocuring reaction. This can be generally at or slightly above room temperature, due to the exothermic nature of polymerization reactions. It can be preferred that the bases remain encapsulated at temperatures below about 40° C., more preferably below about 50° C., and most preferably below about 60° C. It can also be preferred that the encapsulant material undergo a thermal phase transition above these temperatures and that the phase transition temperature range of the encapsulant material be preferably less than about 30° C., more preferably less than about 20° C., and most preferably less than about 10° C.

Preparation of Cationically Curable Composition

The cationically curable composition of the invention can be prepared by combining (for example, by bringing together or mixing) at least one cationically curable species, at least one cationic photoinitiator, and at least one encapsulated, polymer-bound base. Essentially any order and manner of combination of the components can be utilized, but the use of stirring (for example, mechanical stirring or high shear mixing) is generally preferred. Preferably, the components are combined at a temperature that is below any activation temperature of the base. The amount of base used can vary depending upon the concentration of photoinitiator. Photoinitiator can generally be present in the composition in amounts ranging from about 0.05 to about 10 percent by weight, preferably from about 0.05 to about 5 percent by weight (based on the total weight of the above-listed three components). Generally, the composition can contain from about 0.01 to about 10 percent by weight base, preferably from about 0.01 to about 5 percent by weight base (based on the total weight of the above-listed three components).

The curable composition of the invention can also include other species such as coreactants that can serve as viscosity modifiers, act as coadditives or conditioners, or change the glass transition temperature ($T_g$) of the resulting cured composition. In addition, the composition can contain other conventional additives, for example, fillers, pigments, adjuvants, antioxidants, tackifiers, plasticizers, dyes, surface-active agents, viscosity modifiers, and any other additives that can modify the properties of the cured composition without interfering with photocuring or with the stabilizing action of the base.

Photocuring

At least a portion of the cationically curable composition can be irradiated (by exposure to actinic radiation of a wavelength that can activate the photoinitiator) to effect at least partial cure. The curing reaction can generally be allowed to proceed to the vitrification point—the point at which the composition becomes glass-like and no further reaction takes place under the irradiation conditions (for example, time and temperature). The progress of the reaction can be monitored by, for example, differential photo-calorimetry (DPC) or dynamic mechanical analysis (DMA).

The photocuring reaction can generally be carried out at a temperature that is below (preferably, well below) the above-described thermal phase transition temperature of the encapsulant material utilized. It can be preferable if the curing temperature is close to ambient temperature. The resulting at least partially cured composition can then be exposed to conditions sufficient to cause a change in the encapsulant material (for example, a phase change) and thereby activate the base. For example, this can involve raising the temperature of the composition above the thermal phase transition temperature of the encapsulant material. Any method of heating can generally be used (for example, convective heating, conductive heating, microwave heating, and the like).

Useful articles can comprise the resulting at least partially cured composition and can be hard, tack-free solids. However, thermogravimetric analysis (TGA) of the articles can show significant decomposition above 150° C. as the articles are heated. In order to make the articles thermally stable, they can be heated above the thermal phase transition temperature of the encapsulant material to activate the base. The articles generally exhibit improved thermal stability after such heating and can have little weight loss at 300° C. or greater.

Particularly useful articles comprise a substrate bearing on at least a portion of at least one surface thereof the resulting at least partially cured composition of the invention. Useful substrates can include any surface of any shape or dimension that is capable of being coated or covered with cured, partially cured, or curable composition. If desired, the curable composition can be partially cured before application to a substrate, as long as the curing is carried out at a temperature below the thermal phase transition temperature of the encapsulant material. The physical properties of the partially cured composition (such as viscosity, adhesion, and so forth) can facilitate application to the substrate.

Articles contemplated by this invention can include, for example, substrates that are subject to degradation by acid (for example, corrosion), as the composition of the invention is particularly well-suited for use on such substrates. Such substrates include oxidizable metals such as iron, aluminum, copper, cobalt, nickel, and the like, and alloys thereof. The substrates can also include electronic circuit boards or substrates used for electronic devices such as indium-tin-oxide (ITO). Glass can also be used.

EXAMPLES

Objects and advantages of this invention are further illustrated by the following examples, but the particular materials and amounts thereof recited in these examples, as well as other conditions and details, should not be construed to unduly limit this invention.

In the examples, all parts, ratios, and percents are by weight unless specifically indicated otherwise. All examples were prepared in ambient atmosphere (in the presence of usual amounts of oxygen and water vapor) unless indicated otherwise. Solid triarylsulfonium hexafluoroantimonate, $Ar_3SSbF_6$, was prepared essentially according to the method described in U.S. Pat. No. 4,173,476 (Smith et al.). Triarylsulfonium methide, $Ar_3S(C(SO_2CF_3)_3)$, and tris-(trifluoromethylsulfonyl) methane were prepared by metathesis essentially as described in U.S. Pat. No. 5,554,664 (Lamanna et al.).

Glossary

Identification of Components Used in the Examples

As used herein:

"CYRACURE UVR 6105" refers to 3,4-epoxycyclohexyl-methyl-3,4-epoxy cyclohexanecarboxylate, which is available from Dow Chemical Co., Danbury Conn.

"INTELIMER 7001" refers to a polymer-bound base comprising a semi-crystalline acrylate and an aliphatic tertiary amine, obtained from Landec Corp., Menlo Park, Calif.

"INTELIMER 7004" refers to a polymer-bound base comprising a semi-crystalline acrylate and imidazole obtained from Landec Corp., Menlo Park, Calif.

"SILWET L-7230" refers to a silicone surfactant wetting agent obtained from OSi Specialties, Crompton Corp., Middlebury, Conn.

"Sulfonium Methide" refers to $Ar_3S^{+-}C(SO_2CF_3)_3$.

"Sulfonium SbF6" refers to $Ar_3S^{+-}SbF_6$.

"Sulfonium Imide" refers to $Ar_3S^{30\ -}N(SO_2CF_3)_2$.

"Sulfonium Triflate" refers to $Ar_3S^{+-}SO_3CF_3$.

"TONE 0301" refers to poly(caprolactone) triol, which is available from Dow Chemical Co., Danbury Conn.

Differential Scanning Calorimetry (DSC)

Differential scanning calorimetry (DSC) was performed on a TA Instruments Inc. (New Castle, Del.) 2920 DSC differential scanning calorimeter insert after and used to measure the exothermic heat of reaction associated with the thermal cure of cationically polymerizable monomer. DSC samples were typically 6 to 12 mg. Testing was done in sealed, aluminum, liquid sample pans, at a rate of 10° C./min from room temperature (23° C.) to 300° C. The data from the reaction process was graphed on a chart showing heat flow versus temperature. The integrated area under an exothermic peak represents the total exotherm energy produced during the reaction and is measured in Joules/gram (J/g); the exotherm energy is proportional to extent of cure (that is, degree of polymerization). The exotherm profile (that is, the onset temperature (the temperature at which reaction will begin to occur), the peak temperature, and the end temperature) provides information on conditions needed to cure the monomer sample. For any particular reaction, a shift toward lower onset and/or peak temperature for the exotherm indicates that the monomer is polymerizing at the lower temperatures, which correlates with shorter gel times.

Differential Photo-Calorimetry (DPC)

Differential photo-calorimetry was used to measure the exothermic heat of reaction associated with the photoinitiated cure of cationically polymerizable monomer during exposure to light. DPC samples sizes were typically 6 to 12 mg. Testing was done in open aluminum pans, under nitrogen purge, in a TA Instruments Inc. 2920 DSC base, equipped with a TA Instruments Inc. 930 differential photocalorimeter (TA Instruments Inc. New Castle, Del.). A 200 watt mercury lamp was used for the photolysis step. In a typical experiment, the sample was held isothermally at the desired temperature throughout the entire DPC experiment. The sample was kept dark for 2 minutes, then a shutter was opened to allow the sample to be irradiated for 5 minutes after which the shutter was closed and the sample was kept dark for an additional 2 minutes. The data from the DPC experiment was graphed on a chart showing the exothermic heat flow versus time. The area under the exothermic peak represents the total exotherm energy produced during the irradiation, and is measured in Joules/gram (J/g). The exotherm energy is proportional to the extent of cure, and for any particular reaction an increase in the total DPC exotherm energy indicates a higher degree of cure during the irradiation.

Thermogravimetric Analysis (TGA)

Thermogravimetric analysis was used to measure weight changes in a material as a function of temperature under a controlled atmosphere. Testing was done under nitrogen on a TA Instruments Inc. (New Castle, Del.) 2950 TGA thermogravimetric analyzer. The samples, typically weighing less than 20 mg, were placed in aluminum pans that were subsequently placed into platinum pans. The samples were heated at a rate of 10° C./minute from room temperature (23° C.) to 350° C. The data from the TGA experiments were plotted on a chart showing percent of original weight versus temperature.

Dynamic Mechanical Analysis (DMA)

Dynamic mechanical analysis measurements were used to determine the Tg of at least partially cured compositions. The measurements were made on samples approximately 10 mm by 0.5 mm in size. A Sieko DMA dynamic mechanical analyzer (Thermo Haake, Madison, Wis.) unit operating in tensile mode was used to perform the measurements. The test was performed by first cooling a sample to approximately −70° C., then ramping the temperature to 300° C. at 2° C./minute. The oscillation frequency used was 1 Hz. The resulting DMA trace was analyzed with software provided with the instrument. The Tg of the sample was determined by the maximum in the Tan δ peak.

Comparative Examples C1–C8

An epoxy/polyol master stock solution was prepared by combining, in a glass jar, CYRACURE UVR 6105/ TONE 0301 (60:40 w/w). The glass jar was capped and placed in a Despatch LFD 1-42-3 oven (Despatch Industries, Inc. Minneapolis, Minn.), which had been preheated to 50° C. After heating for 15 min, the jar was shaken by hand to ensure complete mixing of the components of the solution.

The effect of varying photoinitiator concentration on degree of cure and thermal stability was examined by DPC, DMA, and TGA analytical techniques. Six stock solutions having different photoinitiators at various concentrations were prepared by combining, in glass jars, 20 grams of the master stock solution with the appropriate photoinitiator and amount indicated in Table 1. The glass jar containing epoxy/polyol/photoinitiator mixture was capped and placed in a Model LFD 1-42-3 oven (manufactured by Despatch Industries, Inc., Minneapolis, Minn.), which had been preheated to 50° C., to ensure complete dissolution of the components. After heating, the jar was shaken vigorously by hand for approximately 15 seconds, and then the mixture was allowed to cool to room temperature.

TABLE 1

| Comparative Example No. | Stock Solution No. | Photoinitiator | Amount of Photoinitiator (g) |
| --- | --- | --- | --- |
| C1 | 1 | Sulfonium Methide | 0.2 |
| C2 | 2 | Sulfonium Methide | 0.1 |
| C3 | 3 | Sulfonium Methide | 0.05 |
| C4 | 4 | Sulfonium $SbF_6$ | 0.2 |
| C5 | 5 | Sulfonium $SbF_6$ | 0.1 |
| C6 | 6 | Sulfonium $SbF_6$ | 0.05 |
| C7 | 7 | Sulfonium Imide | 0.2 |
| C8 | 8 | Sulfonium Triflate | 0.2 |

The resulting compositions were evaluated (following irradiation) by DPC to determine degree of cure. DMA and TGA were used to determine glass transition temperature and thermal stability, respectively. Samples for these techniques were made by using a 7 mil thick polyethylene terephthalate (PET) film (0.007 in, 0.178 mm) to form a mold. The mold construction comprised the PET film having at least one 0.25 in×2 in (6.35 mm×50.8 mm) opening cut into it, and a 2 mil (0.002 in, 0.051 mm) thick PET piece of silicone-treated PET release film placed under the PET film. The mold was filled with stock solution, and a second 2 mil (0.002 in, 0.051 mm) piece of silicone-treated PET release film was placed on top. A rubber, hand roller was used to gently flatten the resulting sandwich construction. The sandwich construction was taped to an aluminum plate and irradiated with a 600 Watt UV Processor (Fusion UV Systems, Inc. Gaithersburg, Md. 20878-1357 USA ) using a D-type bulb. The samples received a dose of 2 J/cm² followed by a thermal postbake using a Despatch LFD 1-42-3 oven (Despatch Industries, Inc., Minneapolis, Minn.) for 15 minutes each at 50, 75, 100, 120 and 140° C. The results are shown in Table 2 below.

TABLE 2

| Comparative Example No. | Stock Solution No. | DPC Enthalpy (J/g) | Tg | % Weight Loss at 346° C. |
| --- | --- | --- | --- | --- |
| C1 | 1 | 291 | 63.6 | 63 |
| C2 | 2 | 310 | 65.9 | 59 |
| C3 | 3 | 288 | 65.9 | 55 |
| C4 | 4 | 316 | 60.5 | 10 |
| C5 | 5 | 308 | 60.4 | 10 |
| C6 | 6 | 285 | 58.8 | 9 |
| C7 | 7 | 208.9 | 67.8 | 62 |
| C8 | 8 | 0 | 66.7 | 65 |

Examples 1–8

Examples 1–8, encapsulated, polymer-bound bases were added to 20 g of some of the above-described Stock Solutions 1–8. The identity and amounts of the bases are shown in Table 3. The base was dispersed in the stock solution by using a high speed Dispersator™ mixer (Premier Mill Corporation, Temple, Pa.) for approximately 2 minutes at 3000 rpm. The resulting composition was placed in a vacuum oven at ambient temperature for 20 minutes to degas, and then used immediately following degasing.

TABLE 3

| Example No. | Stock Solution No. | Encapsulated, Polymer-bound Base | Amount of Encapsulated, Polymer-bound Base |
|---|---|---|---|
| 1 | 1 | INTELIMER 7001 | 0.22 g |
| 2 | 1 | INTELIMER 7004 | 0.31 g |
| 3 | 2 | INTELIMER 7001 | 0.22 g |
| 4 | 2 | INTELIMER 7004 | 0.31 g |
| 5 | 3 | INTELIMER 7001 | 0.22 g |
| 6 | 3 | INTELIMER 7004 | 0.31 g |
| 7 | 7 | INTELIMER 7004 | 0.31 g |
| 8 | 8 | INTELIMER 7004 | 0.31 g |

DPC was used to examine the effect of base on cure; DMA was used to determine glass transition temperature; and TGA was used to examine the thermal stability of the compositions following irradiation. Samples for these techniques were made by using a 7 mil thick PET film (0.007 in, 0.178 mm) to form a mold. The mold construction comprise the PET film having at least one 0.25 in×2 in (6.35 mm×50.8 mm) opening cut into it, and a 2 mil (0.002 in, 0.051 mm) thick piece of silicone-treated PET release film placed under the polyester film. The mold was filled with composition, and a second 2 mil (0.002 in, 0.051 mm) piece of silicone-treated PET release film was placed on top. A rubber, hand roller was used to gently flatten the resulting sandwich construction. The sandwich construction was taped to an aluminum plate and irradiated with a 600 Watt UV Processor (Fusion UV Systems, Inc. Gaithersburg, Md. 20878-1357 USA) using a D-type bulb. The samples received a dose of 2 J/cm$^2$ followed by a thermal postbake using a Despatch LFD 1-42-3 oven (Despatch Industries, Inc., Minneapolis, Minn.) for 15 minutes each at 50, 75, 100, 120 and 140° C. The results are shown in Table 4 below.

TABLE 4

| Example No. | DPC Enthalpy (J/g) | Tg | % Weight Loss at 346° C. |
|---|---|---|---|
| 1 | 292 | 71.9 | 55 |
| 2 | 293 | 68.8 | 6 |
| 3 | 275 | 68.4 | 42 |
| 4 | 294 | 70.4 | 7 |
| 5 | 271 | — | 13 |
| 6 | 249 | — | 11 |
| 7 | 210.1 | 67.2 | 8 |
| 8 | 0 | 56.4 | 52 |

The data in Table 4 show that the addition of the encapsulated, polymer-bound base did not significantly inhibit polymerization during exposure to light, as evidenced by comparison to the appropriate comparative example in Table 2. Tg was not measured for Examples 5 and 6. Additionally, the results in Table 4 show that addition of the encapsulated, polymer-bound base generally improved thermal stability.

Comparative Examples C9 and C10 and Examples 9–12

Corrosion Protection Properties of Photopolymerized Compositions on Copper

Formulations were coated and cured on a PET film that comprised a 150 μ copper layer (deposited by sputtering), with the coating being in contact with the copper. Before coating, the copper/PET film was dipped into a glass baking dish containing dilute sulfuric acid (7 mL conc H$_2$SO$_4$ in 500 mL deionized water) for 2 minutes and then rinsed in deionized water for 2 minutes. The resulting copper substrates were blown dry with nitrogen and then placed in a Despatch LFD 1-42-3 oven (Despatch Industries, Inc., Minneapolis, Minn.), preheated to 50° C., for approximately 20 minutes. After the substrates were removed from the oven, the formulations were immediately coated.

Formulations for Comparative Examples C9–C10 and Examples 9–12 were prepared by combining, in glass jars, 20 g of master stock solution (described above) with 0.20 g of the appropriate photoinitiator listed in Table 5. The glass jars containing the resulting mixtures were capped and placed in a Despatch LFD 1-42-3 oven (Despatch Industries, Inc., Minneapolis, Minn.), which had been preheated to 50° C., to ensure complete dissolution of the components. After heating for approximately 30 minutes, the jars were shaken vigorously, by hand, for approximately 15 seconds and then the mixture was allowed to cool to room temperature. For Examples 9–12, the appropriate encapsulated, polymer-bound base was added in the amount shown in Table 5 and mixed in using a high speed Dispersatorrm mixer (Premier Mill Corporation, Temple, Pa.) for approximately 2 minutes at 3000 rpm.

For Comparative Examples C9 and C10, the stock solutions prepared for Comparative Examples C1 and C4, respectively, were used. For Examples 9–10, the compositions prepared for Examples 1–2 were used. For Examples 11–12, compositions were prepared essentially as in Examples 1–2, using Stock Solution 4.

TABLE 5

| Example No. | Stock Solution No. | Encapsulated, Polymer-bound Base | Amount of Encapsulated, Polymer-bound Base | Photoinitiator |
|---|---|---|---|---|
| C9 | 1 | None | None | Sulfonium Methide |
| C10 | 4 | None | None | Sulfonium SbF$_6$ |
| 9 | 1 | INTELIMER 7001 | 0.22 g | Sulfonium Methide |
| 10 | 1 | INTELIMER 7004 | 0.31 g | Sulfonium Methide |
| 11 | 4 | INTELIMER 7001 | 0.22 g | Sulfonium SbF$_6$ |
| 12 | 4 | INTELIMER 7004 | 0.31 g | Sulfonium SbF$_6$ |

The compositions of Table 5 were applied to the copper surface of the PET film at a 2 mil thickness (0.002 in, 0.05 mm) using a knife coater, and a 2 mil (0.002 in, 0.05 mm) thick piece of silicone-treated PET release liner was used as a top sheet. The resulting sandwich construction was taped to an aluminum plate and irradiated with a 600 Watt UV processor (Fusion UV Systems, Inc. Gaithersburg, Md. 20878-1357 USA) equipped with a D-type bulb. The samples received a dose of 2 J/cm$^2$. After irradiation, a glass plate was placed on top of each film sample to prevent curling during a thermal post-bake. The samples were subjected to a thermal post-bake using a Despatch LFD 1-42-3 oven (Despatch Industries, Inc., Minneapolis, Minn.) for 15 minutes each at 50, 75, 100, 120 and 140° C. The base-containing samples displayed a grainy appearance due to the dispersed solids.

The resulting at least partially cured samples were placed in an 85 percent relative humidity, 85° C. chamber constructed from a Despatch LEA 1-69 oven (Despatch Industries, Inc., Minneapolis, Minn.) and a Watlow 922 Microprocessor-based ramping controller (Watlow Electronic Manufacturing Company, St. Louis, Mo.). The samples were monitored over time with periodic visual inspection for differences. After approximately 2 hours in the chamber, the samples were visually inspected. The sample of Comparative Example C9 had darkened and lost luster in some regions, but overall it was still copper colored; whereas, the samples of Examples 9 and 10 appeared to retain much of the luster and color of the samples before aging. The sample of Comparative Example C10 had visual regions where the copper had darkened slightly and lost luster in some regions, but was still opaque; additionally, other regions of this sample were essentially transparent and were either green or colorless. By comparison, the samples of Examples 11 and 12 retained much of the luster and color of the samples before aging, with the sample for Example 12 being essentially unchanged.

Comparative Examples C11–C13 and Examples 13 and 14

Corrosion Protection Properties of Photopolymerized Compositions on Aluminum

Aluminum-coated PET film (80 μ Al) was prepared by aluminum evaporation and was cleaned, coated, and cured essentially as described above for Comparative Examples C9 and C10 and Examples 9–12. The transmission of the resulting vapor-coated film was determined by comparing the irradiance of an Osram Sylvania BS575 HR SE metal halide lamp (available from Osram-Sylvania, Danvers, Mass.) with and without the vapor-coated film placed between the lamp and the detector of a spectroradiometer. The spectroradiometer used was an Optronics OL754 (Optronic Laboratories, Inc., Orlando, Fla.) with an integrating sphere (Optronics OL752-S) operating with Optronics' Optolab™ software. The spectroradiometer was calibrated with a tungsten halide lamp (Optronics OL752-10E) with calibration traceable to National Institute of Standards and Technology 5 (NIST). The measurement area used was a circle 38 mm in diameter. The fraction of light transmitted by the vapor-coated film was calculated using Equation 1.

$$T_\lambda = \frac{I_{f,\lambda}}{I_{o,\lambda}} \qquad \text{Equation 1}$$

where:

T=Fraction of light at wavelength λ transmitted by vapor-coated film

λ=Wavelength in nanometers at which transmission determined (measurements made from 250 to 400 nm at 2 nm increments)

$I_{f,\lambda}$=Irradiance at wavelength λ measured with vapor-coated film inserted between light source and detector of spectroradiometer $I_{o,\lambda}$=Irradiance at wavelength λ measured with nothing in the optical path between light source and detector of spectroradiometer After initial transmission measurements were obtained, samples were aged in an 85 percent relative humidity, 85° C. chamber constructed from a Despatch LEA 1-69 oven (Despatch Industries, Inc., Minneapolis, Minn.) and a Watlow 922 microprocessor-based ramping controller (Watlow Electronic Manufacturing Company, St. Louis, Mo.). The samples were monitored and compared after approximately three days of aging, yielding the transmission measurements shown in Table 6.

TABLE 6

| Example No. | Sample | Percent Increase in Transmission After Aging |
|---|---|---|
| C11 | Bare Aluminum | 686 |
| C12 | Stock Solution No. 4 | 2434 |
| C13 | Stock Solution No. 1 | 32456 |
| 13 | Composition of Example No. 12 | 1 |
| 14 | Composition of Example No. 10 | −2 |

Comparative Examples C14 and C15 and Examples 15 and 16

Corrosion Protection Properties of Photopolymerized Compositions on Indium-Tin-Oxide-Patterned Glass Formulations were coated on glass slides (20 mm×33 mm) having a pattern of conductive indium-tin-oxide (ITO) on one surface. The pattern consisted of two 2.5 mm×20 mm pads of ITO located along the narrow edges of the glass surface, connected by a 4 mm×28 mm trace. The ITO thickness was 700 Angstroms.

A stock solution of 60 g CYRACURE UVR-6105, 40 g TONE 0301, 1 g $Ar_3S^{+-}SbF_6$, and 3 drops of SILWET L-7230 (Stock Solution A) was prepared by combining the components and stirring by hand using a wood applicator stick (Puritan brand, available from Hardwood Products Co., Guilford, Me.). A second stock solution of 60 g CYRACURE UVR-6105, 40 g TONE 0301, 1 g $Ar_3S^{+-}C(SO_2CF_3)_3$, and 3 drops of SILWET L-7230 (Stock Solution B) was prepared by combining the components and stirring by hand using a wood applicator stick. The two stock solutions were placed in an oven, pre-heated to 80° C., for 30 minutes, followed by hand stirring. A 10 g portion of each stock solution was transferred to a glass jar, and 0.150 g INTELIMER 7004 encapsulated, polymer-bound base was added to each and dispersed using a high shear mixer (Dispersator™ mixer by Premier Mill Corporation, Temple, Pa.) at 3000 rpm for approximately 2 minutes to form two base-containing solutions.

The four formulations (the two stock solutions and the two solutions containing the INTELIMER 7004 base) were coated at 6 mil (0.152 mm) thickness over the center bar of the ITO-patterned glass, using a pressure-sensitive adhesive tape to mask the side regions. Two slides were coated for each formulation. The coated slides were exposed to 2 J/cm² of ultraviolet (UV) irradiation using a 600 Watt Uw processor (Fusion Corp., Gaithersburg, Md.) equipped with a D-type bulb, followed by a post-bake for 30 min at 100° C. The resulting at least partially cured samples were placed in an 85° C., 85 percent relative humidity chamber, with the resistance between the two side pads monitored over time using a Fluke 77 Series II hand-held multimeter (Fluke Corporation, Everett, Wash.). The data in Table 7 show the resistance measurements over time, with an off-scale reading meaning a resistance greater than 32×10⁶ ohms.

TABLE 7

| Example No. | Sample | Resistance Measurements (ohms) versus Time (hours) | | |
| --- | --- | --- | --- | --- |
| | | Initial | 24 hours | 612 hours |
| C14 | Stock Solution B | 226 ohms | off scale | off scale |
| 15 | Stock Solution B Plus Base | 223 ohms | 234 ohms | 266 ohms |
| C15 | Stock Solution A | 221 ohms | 240 ohms | off scale |
| 16 | Stock Solution A Plus Base | 230 ohms | 239 ohms | 243 ohms |

The referenced descriptions contained in the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A composition comprising:
   (a) at least one cationically curable species;
   (b) at least one cationic photoinitiator selected from I-centered onium salts, S-centered onium salts, and mixtures thereof; and
   (c) at least one encapsulated base selected from those represented by the formula $A-B_n$, wherein A is a substantially insoluble particle that comprises at least one side-chain crystallizable polymer, each B is an independently selected base unit comprising a basic species, n is an integer of at least 1, and A and B are joined by a covalent chemical bond.

2. The composition of claim 1 wherein said cationically curable species is a monomer.

3. The composition of claim 1 wherein said cationically curable species is selected from the group consisting of vinyl ethers; vinylidene ethers; N-vinyl carbazoles; vinyl silanes; N-vinyl pyrrolidinone; 1,1-dialkyl-, trialkyl-, and tetralkyl-substituted olefins; styrene; substituted styrenes; cyclic olefins; acyclic olefins; conjugated diolefins; epoxides; cyclic ethers; and mixtures thereof.

4. The composition of claim 1 wherein said cationically curable species is selected from the group consisting of epoxides, vinyl ethers, and mixtures thereof.

5. The composition of claim 1 wherein said onium salt comprises at least one anion selected from the group consisting of:

and

wherein each $R_f$ is independently selected from the group consisting of fluorinated or perfluorinated alkyl radicals having from 1 to about 20 carbon atoms, fluorinated aryl radicals having from 6 to about 10 carbon atoms, and ring structures formed from two said fluorinated or perfluorinated alkyl radicals joined together to form a unitary alkylene radical having 5 or 6 ring atoms, said radicals optionally containing one or more divalent oxygen, trivalent nitrogen, or divalent sulfur atoms.

6. The composition of claim 1 wherein said A is an organic polymer particle.

7. The composition of claim 1 wherein said side-chain crystallizable polymer comprises $C_{12}$–$C_{50}$ aliphatic groups.

8. The composition of claim 1 wherein said B is selected from the group consisting of primary amines, secondary amines, tertiary amines, and heterocyclic amines.

9. The composition of claim 1 wherein said encapsulated base is enclosed in at least one encapsulant material.

10. The composition of claim 9 wherein said encapsulated base is microencapsulated.

11. The composition of claim 1 at least partially cured.

12. An article comprising the composition of claim 11.

13. The article of claim 12 further comprising at least one substrate having at least one surface that is degradable by acid.

14. A composition comprising:
   (a) at least one cationically curable species selected from the group consisting of epoxides, vinyl ethers, and mixtures thereof;
   (b) at least one onium salt selected from I-centered onium salts, S-centered onium salts, and mixtures thereof; and
   (c) at least one encapsulated base selected from those represented by the formula $A-B_n$, wherein A comprises at least one side-chain crystallizable polymer; B is a base unit selected from the group consisting of primary amines, secondary amines, tertiary amines, and imidazoles; n is an integer of at least 1; and A and B are joined by a covalent chemical bond.

15. The composition of claim 14 wherein said onium salt comprises an anion selected from the group consisting of $C(SO_2CF_3)_3^-$ and $N(SO_2CF_3)_2^-$, and said base unit is imidazole.

16. The composition of claim 14 at least partially cured.

17. An article comprising the composition of claim 16.

18. The article of claim 17 further comprising at least one substrate having at least one surface that is degradable by acid.

19. A process comprising the steps of:
   (a) providing a composition comprising:
      (1) at least one cationically curable species;
      (2) at least one cationic photoinitiator selected from I-centered onium salts, S-centered onium salts, and mixtures thereof; and
      (3) at least one encapsulated base selected from those represented by the formula $A-B_n$, wherein A is a substantially insoluble particle that comprises at least one side-chain crystallizable polymer, each B is an independently selected base unit comprising a basic species, n is an integer of at least 1, and A and B are joined by a covalent chemical bond;
   (b) irradiating at least a portion of said composition to effect at least partial cure of said portion; and
   exposing at least said portion of said composition to conditions sufficient to make said encapsulated base chemically available for reaction.

* * * * *